United States Patent
Chou et al.

(10) Patent No.: US 7,595,847 B2
(45) Date of Patent: Sep. 29, 2009

(54) AUDIO/VIDEO PLAYBACK CONTROL SYSTEM OF LIQUID CRYSTAL DISPLAY TELEVISION

(75) Inventors: Chin-Wen Chou, Taipei Hsien (TW); Ying-Nan Cheng, Taipei Hsien (TW); Chin-Biau Chung, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 552 days.

(21) Appl. No.: 11/155,582

(22) Filed: Jun. 20, 2005

(65) Prior Publication Data

US 2006/0285024 A1    Dec. 21, 2006

(51) Int. Cl.
*H04N 5/63* (2006.01)
*H04N 3/14* (2006.01)

(52) U.S. Cl. ................................. 348/790; 348/730
(58) Field of Classification Search ........... 348/790, 348/730, 792, 794, 705, 838, 554; 345/211, 345/212, 87, 102; 455/343.1–343.6
See application file for complete search history.

(56) References Cited

U.S. PATENT DOCUMENTS

| | | | | |
|---|---|---|---|---|
| 4,581,654 A | * | 4/1986 | Kobayashi et al. | 348/790 |
| 4,868,466 A | * | 9/1989 | Lendaro | 315/411 |
| 5,093,605 A | * | 3/1992 | Meinertz | 315/411 |
| 5,313,225 A | * | 5/1994 | Miyadera | 345/102 |
| 5,790,096 A | * | 8/1998 | Hill, Jr. | 345/600 |
| 5,900,913 A | * | 5/1999 | Tults | 348/468 |
| 6,072,994 A | * | 6/2000 | Phillips et al. | 455/84 |
| 6,437,699 B1 | * | 8/2002 | Hayakawa | 340/636.13 |
| 6,650,376 B1 | * | 11/2003 | Obitsu | 348/730 |
| 7,317,495 B2 | * | 1/2008 | Takahashi | 348/838 |
| 2002/0113907 A1 | * | 8/2002 | Endo et al. | 348/730 |
| 2004/0160408 A1 | * | 8/2004 | Hwang | 345/102 |
| 2005/0219423 A1 | * | 10/2005 | Kamise et al. | 348/730 |
| 2005/0231458 A1 | * | 10/2005 | Miki | 345/102 |
| 2005/0264702 A1 | * | 12/2005 | Yoshii | 348/687 |
| 2006/0097955 A1 | * | 5/2006 | Kato | 345/1.1 |
| 2006/0125814 A1 | * | 6/2006 | Asai et al. | 345/204 |

* cited by examiner

*Primary Examiner*—Victor R Kostak
(74) *Attorney, Agent, or Firm*—Muncy, Geissler, Olds & Lowe, PLLC

(57) ABSTRACT

An audio/video playback control system of liquid crystal display television (LCD TV) is provided to control an audio signal system, an image display system and a backlight source system of an LCD TV, and the control system uses an audio/video control unit to maintain an activated status in normal conditions, and the audio/video control unit receives a signal transmitted from an external control interface to determine whether or not to output an activate signal to activate the audio processing unit or activate the video processing unit and the backlight source system, or jointly activate the audio processing unit, the video processing unit and backlight source system, so as to achieve the digital control of the LCD TV and the power-saving purpose.

2 Claims, 1 Drawing Sheet

AUDIO/VIDEO PLAYBACK CONTROL SYSTEM OF LIQUID CRYSTAL DISPLAY TELEVISION

FIELD OF THE INVENTION

The present invention relates to an audio/video playback control system of liquid crystal display television (LCD TV), and more particularly to a control system used for a single audio/video playback mode or a joint playback mode of LCD TV.

BACKGROUND OF THE INVENTION

For the present LCD TVs, an alternate current (AC) of an AC power supply is converted into a low-voltage direct current (DC) by an AC-to-DC power supply, and the specification of outputting DC includes 5V, 12V, 24V, and 48V depending on different manufacturers. The low-voltage DC is supplied for the use of low-voltage loads of a television, and the low-voltage loads include devices such as a display driven panel, an audio/video processing circuit board, and a speaker, etc, and this low-voltage DC is also outputted to a high-voltage power converting system. The high-voltage power converting system steps up the low-voltage DC and then outputs the DC to the high-voltage load of the high-voltage power driven television, and the high-voltage load is a backlight module having a gas discharged lamp (such as a cold cathode ray tube).

However, the digital LCD TV only changes the video signal processing method to the digital coding for its application, and thus an LCD TV can have many digital functions such as adding a video memory card reader to the digital TV, so that after a user inserts a digital video memory with photos taken by a digital camera, the LCD TV is converted into an LCD electronic album for viewing the photos. Further, a radio frequency modulator function is added to the LCD TV or an audio/video player is connected directly to the LCD TV, so that the LCD TV can play music directly. However, all power systems of the LCD TV are turned on, if a user selects the function of viewing photos or the function of playing music from the present LCD TVs. Therefore, the components still consume electric power even if these components are not used for the desired operating function. Particularly, if a user only uses the function of playing music and the backlight source system and the video processing system are activated, it increases the power consumption and shortens the life of components as well as the LCD TV.

SUMMARY OF THE INVENTION

The primary objective of the present invention is to overcome the foregoing shortcomings and avoid the existing deficiencies. The invention is used for controlling an audio/video system, an image display system and a backlight source system of an LCD TV. The control system of the invention uses the audio/video control unit to maintain the activated status under normal conditions, and the audio/video control unit receives a signal transmitted from an external control interface to determine whether or not to output an activate signal to turn on an audio signal processing unit, or turn on the video processing unit and backlight source system, or jointly turn on the audio signal processing unit, the video processing unit and the backlight source system, so as to achieve the digital control of the LCD TV and the power-saving purpose.

DETAILED DESCRIPTION OF THE PREFERRED EMBODIMENTS

Figure 1:
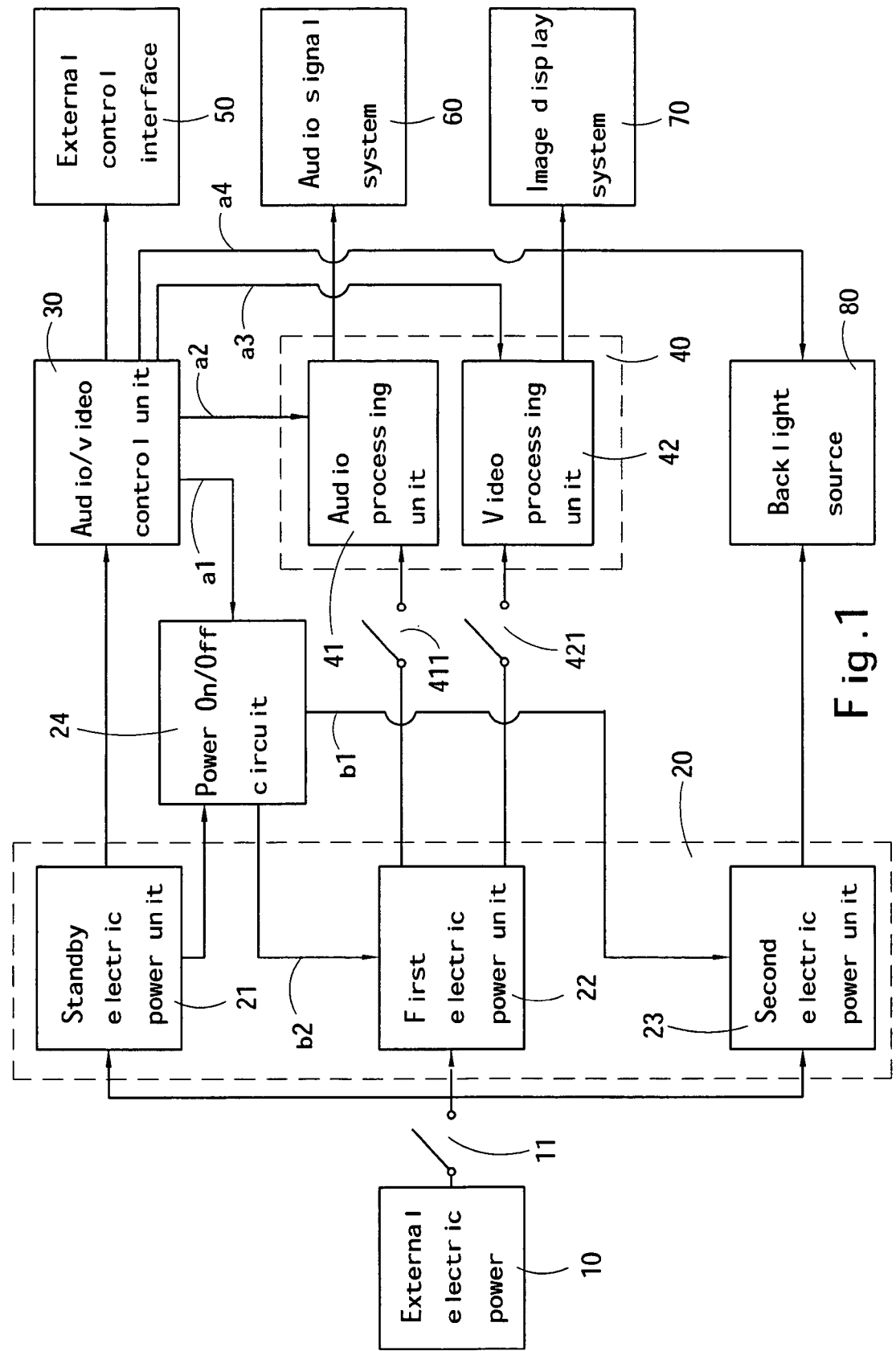
FIG. 1 is a schematic circuit block diagram of the present invention.

The technical contents of the present invention will now be described in more detail hereinafter with reference to the accompanying drawings that show various embodiments of the invention.

Referring to FIG. 1 for the schematic circuit block diagram of the present invention, an audio/video playback control system of an LCD TV is used for controlling an audio signal system 60, an image display system 70 and a backlight source system 80 of an LCD TV, and the control system comprises the following components:

An audio/video transmitting unit 40 includes an audio signal processing unit 41 for driving the audio signal system 60 and a video processing unit 42 for driving the image display system 70.

An electric power system 20 includes a standby electric power unit 21 electrically connected to an external electric power 10 in normal conditions and capable of powering on the system, an output electric power for driving a first electric power unit 22 of an audio/video transmitting unit 40 and an output electric power for driving a second electric power unit 23 of the backlight source system 80. The foregoing standby electric power unit 21 further includes a switch circuit 11 disposed between the standby electric power unit 21 and the external electric power 10 for transmitting a power ON/OFF signal. The low-voltage DC such as 5V, 12V, 24V and 48V outputted and converted by the first electric power unit 22 is supplied for driving the audio/video transmitting unit 40 and also supplying the operating power for the audio signal system 60 (such as a built-in speaker) and the image display system 70 (such as a display screen), and the power supply for the second electric power unit 23 of the low-end LCD TV also comes from the first electric power unit 22 for supplying DC, and the current is stepped up by an inverter to convert the power into a high-voltage power to drive the backlight source system 80. The high-end LCD TV adopts an external electric power 10 rectified into a mid-voltage DC (such as 120V, 155V, 240V, 380V or 400V) for driving the backlight source system 80 directly. However, the aforementioned power driving modes are well known in the arts, and thus will not be described here.

The invention also comprises an audio/video control unit 30 and an external control interface 50, and the audio/video control unit 30 is maintained at an activated status in normal conditions by the power supply of the standby electric power unit 21, and the external control interface 50 could be a remote control. The audio/video control unit 30 receives a signal transmitted from the external control interface 50 to determine whether or not to output an activate signal a1, a2, a3, a4 to activate the audio signal processing unit 41, or activate the video processing unit 42 and the backlight source system 80, or jointly activate the audio signal processing unit 41, the video processing unit 42 and the backlight source system 80.

If a user wants to use the video display function of the LCD TV only, such as viewing the digital photos, then the external control interface 50 is used to transmit a signal for activating the video display function to the audio/video control unit 30, and the audio/video control unit 30 outputs the activate signal a1, a3, a4 to activate the video processing unit 42 and the backlight source system 80. The activation is performed by a power on/off circuit 24 installed between the audio/video control unit 30 and the electric power system 20, and the power on/off circuit 24 receives the activate signal a1 and outputs a drive signal b1, b2 to turn on or off the first electric power unit 22 and the second electric power unit 23 for outputting electric power. The power on/off circuit 24 also maintains the power supply at normal conditions by the standby electric power unit 21, or the activate signal a3, a4 of the audio/video control unit 30 directly drives to turn on the video processing unit 42 and the backlight source system 80. In this preferred embodiment, the activate signal a3 of the audio/video control unit 30 is used to turn on or off a switch circuit 411 installed between the video processing unit 42 and the first electric power unit 22. From the description above, it is obvious that when a user operates the video display function, the audio signal system 60 and the audio signal processing unit 41 of the LCD TV are disconnected and not turned on, and thus the invention can effectively avoid unnecessary waste of electric power.

If a user wants to use the function of playing music only, then the external control interface 50 sends a signal of activating the music playback function to the audio/video control unit 30, and the audio/video control unit 30 outputs an activate signal a1, a2 to turn on the audio signal processing unit 41 and audio signal system 60, and similarly the activation is performed by a power on/off circuit 24 installed between the audio/video control unit 30 and the electric power system 20, and the power on/off circuit 24 receives the activate signal a1 and outputs a drive signal b2 to turn on or off the first electric power unit 22 for outputting electric power, or the activate signal a2 of the audio/video control unit 30 directly drives to turn on the audio signal processing unit 41. In this preferred embodiment, the activate signal a2 of the audio/video control unit 30 is used to turn on or off a switch circuit 421 installed between the audio signal processing unit 41 and the first electric power unit 22. From the description above, it is obvious that when a user operates the function of playing music, the image display system 70, the video processing unit 42, the second electric power unit 23 and the backlight source system 80 of the LCD TV are disconnected and turned off, so as to avoid unnecessary waste of electric power. Further, no image source is produced, and thus can prevent any interference of light in the environment.

If a user wants to watch a movie or a TV program, then all of functions are turned on. If the user connects the LCD TV to external stereo equipments, then the existing audio signal system 60 and audio signal processing unit 41 are no longer needed, and the user can set up the LCD TV according to actual needs.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An audio/video playback control system of liquid crystal display television (LCD TV), used for selectively controlling an audio signal system, an image display system and a backlight source system of an LCD TV, so as to display one of fixed images, TV or play audio signals and said control system comprising:

an audio/video transmitting unit, including an audio signal processing unit for driving said audio signal system and a video processing unit for driving said image display system;

an electric power system, including a standby electric power unit electrically coupled to an external electric power through a switch circuit under normal conditions and capable of powering on said system, an output electric power for driving a first electric power unit of said audio/video transmitting unit and an output electric power for driving a second electric power unit of said backlight source system, said first and second electric power units connected to said external electric power through said switch circuit;

said first electric power unit being connected to said audio signal processing unit through an audio switch circuit and being connected to said video signal processing unit through a video switch circuit;

an audio/video control unit and a manually controlled external control interface, and said audio/video control unit being maintained at an activated status by the power supplied by said standby electric power unit, and said audio/video control unit receives a signal transmitted from said external control interface to determine whether or not to output an activate signal to activate said audio signal processing unit and deactivate said video processing unit and said backlight source system, or activate said video processing unit and said backlight source system and deactivate said audio signal processing unit, or jointly activate said audio signal processing unit, said video processing unit and said backlight source system so as to display one of fixed images, TV or play audio signals;

a power on/off circuit installed between said audio/video control unit and said electric power system, and said power on/off circuit receives said activate signal and outputs a drive signal to selectively turn on or off the first electric power unit and the second electric power unit for outputting electric power;

said audio switch and said video switch being directly controlled by said activate signal of said audio/video control unit to activate or deactivate said audio and video processing units.

2. The audio/video playback control system of liquid crystal display television of claim 1, wherein said power on/off circuit is maintained in an activated status under normal conditions by the electric power supplied by said standby electric power unit.

* * * * *